3,200,081
MIXED ANTIMONY OXIDE-MANGANESE OXIDE OXIDATION CATALYST
James L. Callahan, Bedford, Ohio, and Berthold Gertisser, New York, N.Y., assignors to The Standard Oil Company, Cleveland, Ohio, a corporation of Ohio
No Drawing. Filed Oct. 15, 1962, Ser. No. 230,684
7 Claims. (Cl. 252—443)

This invention relates to oxidation catalyst systems consisting essentially of oxides of antimony and manganese and to the catalytic oxidation of olefins to oxygenated hydrocarbons such as saturated aldehydes, for example, propylene to acrolein, and to the oxidation of olefin-ammonia mixtures to unsaturated nitriles, such as propylene-ammonia to acrylonitrile, using such systems.

U.S. Patent No. 2,904,580 dated September 15, 1959, describes a catalyst composed of antimony oxide and molybdenum oxide, as antimony molybdate, and indicates its utility in converting propylene to acrylonitrile.

British Patent 864,666 published April 6, 1961, describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal; such as antimony molybdate or molybdenum antimonate. These catalyst systems are said to be useful in the production of unsaturated aldehydes such as acrolein or methacrolein from olefins such as propylene or isobutene and oxygen.

British Patent 876,446 published August 30, 1961, describes catalysts including antimony, oxygen and tin, and said to be either mixtures of antimony oxides with tin oxides, or oxygen-containing compounds of antimony and tin such as tin antimonate. These catalysts are said to be useful in the production of unsaturated aliphatic nitriles such as acrylonitrile from olefins such as propylene, oxygen and ammonia.

I. THE CATALYST

In accordance with the invention, an oxidation catalyst is provided consisting essentially of oxides of antimony and manganese. This catalyst is useful not only in the oxidation of olefins to oxygenated hydrocarbons such as acrolein and the oxidation of olefin-ammonia mixtures to unsaturated nitriles such as acrylonitrile, but also in the catalytic oxidative dehydrogenation of olefins to diolefins.

The nature of the chemical compounds which compose the catalyst of the invention is not known. The catalyst may be a mixture of antimony oxide or oxides and manganese oxide or oxides. It is also possible that the antimony and manganese are combined with the oxygen to form a manganese antimonate. X-ray examination of the catalyst system has indicated the presence of a structurally common phase of the antimony type, composed of antimony oxide, and some form of manganese oxide. Antimony tetroxide has been identified as present. For the purposes of description of the invention, this catalyst system will be referred to as a mixture of antimony and manganese oxides, but this is not to be construed as meaning that the catalyst is composed either in whole or in part of these compounds.

The proportions of antimony and manganese in the cataylst system may vary widely. The Sb:Mn atomic ratio can range from about 1:50 to about 99:1. However, optimum activity appears to be obtained at Sb:Mn atomic ratios within the range from 1:1 to 25:1.

The catalyst can be employed without support, and will display excellent activity. It also can be combined with a support, and preferably at least 10% up to about 90% of the supporting compound by weight of the entire composition is employed in this event. Any known support materials can be used, such as, for example, silica, alumina, zirconia, alundum, silicon carbide, alumina-silica, and the inorganic phosphates, silicates, aluminates, borates and carbonates stable under the reaction conditions to be encountered in the use of the catalyst.

The antimony oxide and manganese oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, metaantimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The manganese oxide component can be provided in the form of any manganese oxide, or by precipitation in situ from a soluble manganese salt such as the nitrate, acetate, or a halide such as the chloride. Manganese metal can be used as a starting material, and if antimony metal is also employed, the antimony can be converted to the oxide and manganese to the nitrate simultaneously by oxidation in hot nitric acid. A slurry of hydrous antimony oxide formed in situ from the metal in nitric acid also can be combined with a solution of a manganese salt such as manganese nitrate, which is then precipitated in situ as a manganese oxide by the addition of ammonium hydroxide. The ammonium nitrate and any other soluble salts are removed by filtration of the resulting slurry.

It will be apparent from the above that manganous formate, manganous acetate, manganous dibromide, manganous diiodide, manganous dichloride, manganic perchloride, manganic perbromide, manganous difluoride, manganic trifluoride, manganous nitrate, manganous sulfate, manganic sulfate, manganous thiocyanate, manganous dibasic phosphate, manganous ammonium-sulfate, manganese (ous, ic) oxide $Mn_3O_4$, manganous oxide, manganous dioxide, manganic oxide, manganese heptaoxide, and manganese trioxide can be employed as the source of the manganese oxide component.

The catalytic activity of the system is enhanced by heating at an elevated temperature. Preferably, the catalyst mixture is dried and heated at a temperature of from about 500 to about 1150° F. preferably at about 700 to 900° F., for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F. for from one to forty-eight hours, in the presence of air or oxygen. Usually this limit is not reached before 2000° F. and in some cases, this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-manganese oxide catalyst composition of the invention can be defined by the following empirical formula:

$$Sb_aMn_bO_c$$

where $a$ is 1 to 99, $b$ is 50 to 1, and $c$ is a number taken to satisfy the average valences of antimony and manganese in the oxidation states in which they exist in the catalyst as defined by the empirical formula above. Thus, the Sb valence may range from 3 to 5 and the Mn valence from 2 to 7.

This catalyst system is useful in the oxidation of olefins to oxygenated compounds, such as aldehydes, in the presence of oxygen, and in the oxidation of olefins to unsaturated nitriles in the presence of oxygen and ammonia. Both nitriles and aldehydes can be produced simultaneously using process conditions within the overlapping ranges for these reactions, as set forth in detail below. The term "oxidation" as used in this specification and claims encompasses the oxidation to aldehydes and to nitriles, both of which require oxygen as a reactant.

II. OXIDATION OF OLEFINS TO ALDEHYDES

The reactants used in the oxidation to oxygenated compounds are oxygen and an olefin having only three carbon atoms in a straight chain such as propylene or isobutylene, or mixtures thereof.

The olefins may be in admixture with paraffinic hydrocarbons, such as ethane, propane, butane and pentane, for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., 10 to 100 p.s.i.g., temperatures in the range of 500 to 1100° F. may be advantageously employed. However, the process may be conducted at other pressures, and in the case where superatmospheric pressures, e.g., above 100 p.s.i.g., are employed, somewhat lower temperatures are feasible. In the case where this process is employed to convert propylene to acrolein, a temperature range of 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and it may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time, will, of course, vary, depending upon the olefin being treated, but in the case of propylene the preferred apparent contact time is 0.5 to 15 seconds.

A molar ratio of oxygen to olefin between about 0.5:1 to 5:1 generally gives the most satisfactory results. For the conversion of propylene to acrolein, a preferred ratio of oxygen to olefin is from about 1:1 to about 2:1. The oxygen used in the process may be derived from any source; however, air is the least expensive source of oxygen, and is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of from 1:0.5 to 1:10 will give very satisfactory results, and a ratio of from 1:0.75 to 1:6 has been found to be optimum when converting propylene to acrolein. The water, of course, will be in the vapor phase during the reaction.

Inert diluents such as nitrogen and carbon dioxide may be present in the reaction mixture.

In general, any apparatus of the type suitable for carrying out oxidation reactions in the vapor phase may be employed for the execution of the process. The process may be operated continuously or intermittently, and may employ a fixed bed with a large particulate or pelleted catalyst, or a so-called "fluidized" bed of catalyst. The fluidized bed permits a closer control of the temperatures of the reaction, as is well known to those skilled in the art, and a fixed bed gives closer control of contact time.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any unreacted olefin and oxygen being recycled through the reactor. In the case where air is employed as the oxidizing agent in lieu of molecular oxygen, the residual product after separation of the carbonyl product may be scrubbed with a non-polar solvent, e.g., a hydrocarbon fraction, in order to uncover unreacted olefin and in this case the remaining gases may be discarded. An inhibitor to prevent polymerization of the unsaturated products, as is well known in the art, may be added at any stage.

III. OXIDATION OF OLEFINS TO NITRILES

The reactants used are the same as in II above, plus ammonia. Any of the olefins described can be used.

In its preferred aspect, the process comprises contacting a mixture comprising propylene or isobutylene, ammonia and oxygen with the catalyst at an elevated temperature and at atmospheric or near atmospheric pressure.

Any source of oxygen may be employed in this process. For economic reasons, however, it is preferred that air be empolyed as the source of oxygen. From a purely technical view-point, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present. Consequently, the addition of saturated hydrocarbons to the feed to the reaction is contemplated within the scope of this invention. Likewise, diluents such as nitrogen and the oxides of carbon may be present in the reaction mixture without deleterious effect.

The molar ratio of ammonia to olefin in the feed to the reaction may vary between about 0.05:1 to 5:1. There is no real upper limit for the ammonia-olefin ratio, but there is generally no reason to exceed the 5:1 ratio. At ammonia-olefin ratios appreciably less than the stoichiometric ratio of 1:1, various amounts of oxygenated derivatives of the olefin will be formed.

Significant amounts of unsaturated aldehydes as well as nitriles will be obtained at ammonia-olefin ratios substantially below 1:1, i.e., in the range of 0.15:1 to 0.75:1. Outside the upper limit of this range only insignificant amounts of aldehydes will be produced, and only very small amounts of nitriles will be produced at ammonia-olefin ratios below the lower limit of this range. It is fortuitous that within the ammonia-olefin range stated, maximum utilization of ammonia is obtained and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and yield of nitrile. However, reactions not including water in the feed are not to be excluded from this invention, inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range from about 550 to about 1100° F. The preferred temperature range is from about 800 to 1000° F.

The pressure at which reaction is conducted is also an important variable, and the reaction should be carried out at about atmospheric or slightly above atmospheric (2 to 3 atmospheres) pressure. In general, high pressures, i.e., about 250 p.s.i.g., are not suitable, since higher pressures tend to favor the formation of undesirable by-products.

The apparent contact time is not critical, and contact time in the range of from 0.1 to about 50 seconds may be employed. The optimum contact time will, of course, vary, depending upon the olefin being treated, but in general, a contact time of from 1 to 15 seconds is preferred.

In general, any apparatus of the type suitable for carrying out oxidation reactions in the vapor phase may be employed in the execution of this process. The process may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large scale operation, it is preferred to carry out the process in a continuous manner, and in such a system the recirculation of the unreacted olefin is contemplated. Periodic regeneration or reactivation of the catalyst is also contemplated, and this may be accomplished, for example, by contacting the catalyst with air at an elevated temperature.

The products of the reaction may be recovered by any of the methods known to those skilled in the art. One such method involves scrubbing the effluent gases from the reactor with cold water or an appropriate solvent to remove the products of the reaction. If desired, acidified water can be used to absorb the products of reaction and neutralize unconverted ammonia. The ultimate recovery of the products may be accomplished by conventional means. The efficiency of the scrubbing operation may be improved when water is employed as the scrubbing agent by adding a suitable wetting agent to the water. Where molecular oxygen is employed as the oxidizing agent in this process, the resulting product mixture remaining after the removal of the nitriles may be treated to remove carbon dioxide with the remainder of the mixture containing the unreacted propylene and oxygen being recycled through the reactor. In the case where air is employed as the oxidizing agent in lieu of molecular oxygen, the residual product after separation of the nitriles and other carbonyl products may be scrubbed with a nonpolar solvent, e.g., a hydrocarbon fraction, in order to recover unreacted propylene and in this case the remaining gases may be discarded. The addition of a suitable inhibitor to prevent polymerization of the unsaturated products during the recovery steps is also contemplated.

The following examples, in the opinion of the inventors, represent preferred embodiments of the catalyst system of the invention, and of the processes of oxidation of olefins therewith.

*Example 1*

The following procedure was employed to prepare a catalyst composed of antimony oxide and manganese oxide having an Sb:Mn atomic ratio of 1.35 to 1. 45 g. of antimony metal (less than 25 mesh) was heated in 186 cc. of concentrated nitric acid until all red oxides of nitrogen had been given off. To this was added 200 cc. of an aqueous solution containing 49 g. of manganous nitrate. Twenty-eight percent ammonium hydroxide was added until a pH of 7.2 was reached. The slurry was filtered, and washed with 300 cc. of 2.5% ammonium hydroxide solution, divided into three equal portions. Air was drawn through the filter cake for one hour following the last washing. The catalyst was dried overnight at 120° C., calcined at 800° F. overnight, and heat-treated overnight at 1400° F. in a muffle furnace open to the atmosphere.

The activity of this catalyst in the conversion of propylene to acrylonitrile was determined using a micro reactor composed of a feed induction system, a molten salt bath furnace reactor, sampling valve and vapor phase chromatograph. The reactor was placed in the salt bath furnace, and connected with the feed induction system and sampling device. The reaction was carried out at a temperature of approximately 880° F. using a catalyst charge of 9.6 g. A gas mixture containing propylene/ammonia/air in a volume ratio of 1 to 1 to 12 was passed over the catalyst at an apparent contact time of three seconds. 48.6% of the propylene feed was converted to acrylonitrile, and the remainder to acetonitrile and carbon oxides.

*Example 2*

The catalyst of Example 1 (37.9 grams) was mixed with 12.7 g. of silicon carbide obtained by grinding silicon carbide pellets. Sufficient water was added to form a smooth paste. This was dried and calcined overnight at 800° F. 7.7 g. of this catalyst was employed in the reactor of Example 1 under the same conditions. 61.9% of the propylene feed was converted to acrylonitrile, 20% to acetonitrile, and the remainder to carbon oxides.

*Examples 3 to 7*

One hundred grams of antimony metal was oxidized by heating in 420 cc. of concentrated nitric acid until evolution of nitrogen oxides had ceased. The suspension of antimony oxide was added to 218 g. of a 50% solution of manganous nitrate. Next, 340 cc. of 28% ammonium hydroxide solution was added with vigorous stirring, and the slurry filtered. The filter cake was washed with 300 cc. of water divided into three equal portions. Air was drawn through the filter cake for 10 minutes. The material was then dried at 120° C. The resulting powder was passed through a 35 mesh sieve, pelleted, and calcined at 800° F. overnight. The catalyst was then activated by heating in a muffle furnace open to the atmosphere at 1400° F. for 8 hours.

This catalyst was employed in a bench scale reactor having a capacity of approximately 100 ml. of catalyst, in a fixed bed, for the conversion of propylene to acrylonitrile, and to acrolein. The feed gases were metered by Rotameters, and water was fed by means of a Sigma motor pump through capillary copper tubing. In the test, a 90 ml. catalyst charge was used. The molar ratios of propylene/ammonia/air/nitrogen/water (for acrylonitrile) and propylene/air/nitrogen/water (for acrolein) are given in Tables I and II, together with the apparent contact time and the reaction temperature and yield.

*Table I*

| Example No. | Feed Molar Ratio, $C_3^=/$ $NH_3/Air/$ $N_2/H_2O$ | Apparent Contact Time (seconds) | Temperature, ° F. | Total | Percent Conversion Per Pass | |
|---|---|---|---|---|---|---|
| | | | | | Acrylonitrile | Acetonitrile |
| 3 | 1/1.5/12/4/1 | 4 | 870 | 70.7 | 57.2 | 3.3 |
| 4 | 1/1.5/12/4/1 | 3.5 | 900–930 | 69.0 | 49.6 | 3.5 |
| 5 | 1/1.5/12/4/1 | 4 | 860–870 | 67.0 | 51.6 | 5.4 |

*Table II*

| Example No. | Feed Molar Ratio, $C_3^=/$ $Air/N_2/H_2O$ | Apparent Contact Time (seconds) | Temperature, ° F. | Total | Percent Conversion Per Pass | |
|---|---|---|---|---|---|---|
| | | | | | Acrolein | Acetaldehyde |
| 6 | 1/10/4/0.8 | 4 | 860–880 | 43.0 | 25.8 | 1.0 |
| 7 | 1/10/4/0.8 | 2 | 860–870 | 40.4 | 25.0 | 1.1 |

Excellent per pass conversions to acrylonitrile and to acrolein are thus obtainable, using this catalyst system.

We claim:

1. A catalyst composition consisting essentially of an active catalytic oxide complex of antimony and manganese as an essential catalytic ingredient, the Sb:Mn atomic ratio being within the range from about 1:50 to about 99:1, said complex being formed by heating the mixed oxides of antimony and manganese in the presence of oxygen at an elevated temperature above 500° F. but below their melting point for a time sufficient to form said active catalytic oxide complex of antimony and manganese.

2. The catalyst composition in accordance with claim 1 in which the Sb:Mn atomic ratio is within the range of from about 1:1 to about 25:1.

3. A catalyst composition in accordance with claim 1, carried on a support.

4. A catalyst composition in accordance with claim 3, in which the support is silicon carbide.

5. A catalyst composition in accordance with claim 1, said complex being further activated by heating at a temperature above about 1000° F., but below its melting point.

6. A catalyst composition consisting essentially of an active catalytic oxide complex of antimony and manganese as an essential catalytic ingredient, the catalyst having a composition corresponding to the empirical chemical formula $Sb_aMn_bO_c$, where $a$ is a number within the range from about 1 to about 99, $b$ is a number within the range from about 50 to 1, and $c$ is a number taken to satisfy the average valences of antimony and manganese in the oxidation states in which they exist in the catalyst; said complex being formed by heating of the mixed oxides of antimony and manganese in the presence of oxygen at an elevated temperature above 500° F. but below their melting point for a time sufficient to form said active catalytic oxide complex of antimony and manganese.

7. The catalyst composition in accordance with claim 6 in which the Sb:Mn atomic ratio is within the range of from about 1:1 to about 25:1.

References Cited by the Examiner

UNITED STATES PATENTS

| | | | |
|---|---|---|---|
| 2,481,826 | 9/49 | Cosby | 260—465.3 |
| 2,621,204 | 12/52 | MacLean et al. | 260—465.3 |
| 2,670,379 | 2/54 | Hadley et al. | 260—604 |
| 2,739,947 | 3/56 | Drew et al. | 252—471 |
| 2,776,316 | 1/57 | Baldwin | 260—604 |
| 2,838,462 | 6/58 | Pease | 252—471 |
| 2,849,493 | 8/58 | Shelton et al. | 252—443 X |
| 2,941,007 | 6/60 | Callahan | 260—604 |
| 3,009,943 | 11/61 | Hadley et al. | 260—465.3 |
| 3,071,601 | 1/63 | Aries | 252—471 X |
| 3,094,565 | 6/63 | Bethell et al. | 252—456 X |

MAURICE A. BRINDISI, *Primary Examiner.*

CHARLES B. PARKER, BENJAMIN HENKIN,
*Examiners.*